March 10, 1959     S. SCHNELL     2,876,625
RATIO CHANGER
Filed June 6, 1955
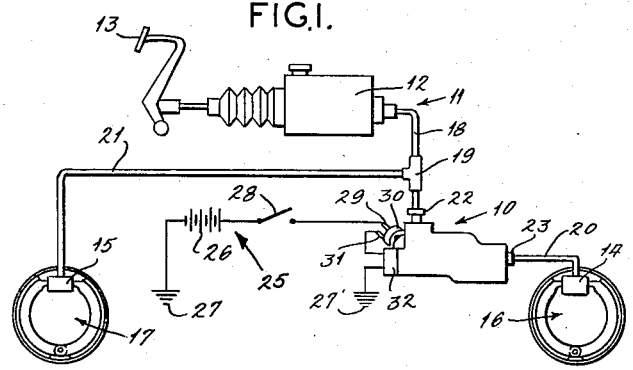
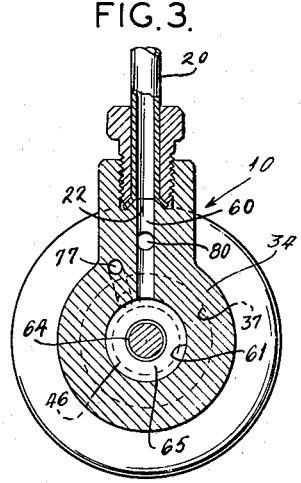
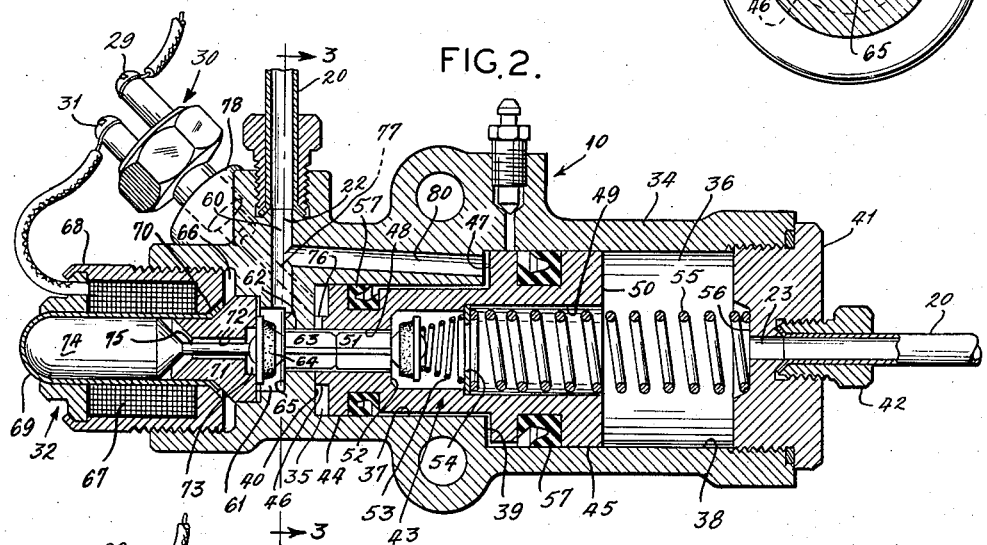
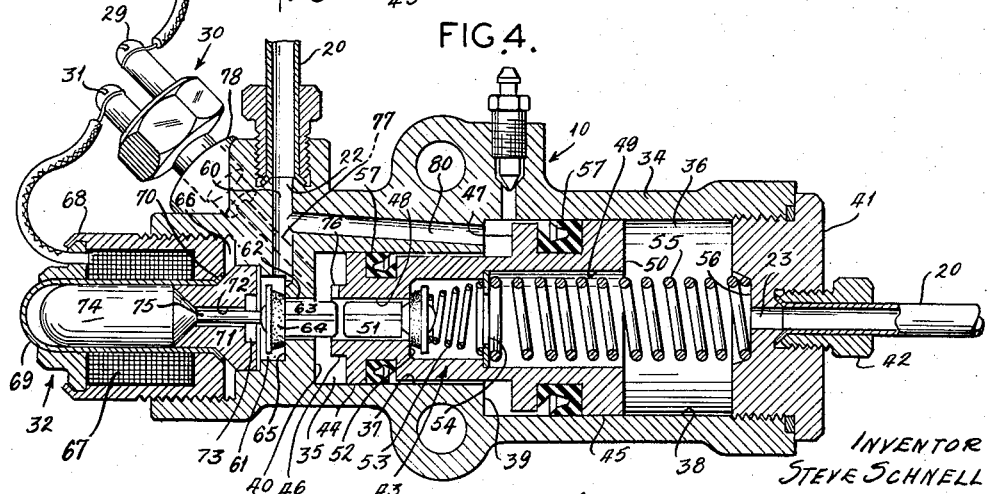
INVENTOR
STEVE SCHNELL
By Gravely, Lieder, Woodruff & Wills
ATTORNEYS.

United States Patent Office 2,876,625
Patented Mar. 10, 1959

2,876,625

RATIO CHANGER

Steve Schnell, St. Louis, Mo., assignor to Wagner Electric Corporation, St. Louis, Mo., a corporation of Delaware Application June 6, 1955, Serial No. 513,320

5 Claims. (Cl. 60—54.5)

This invention relates generally to the automotive brake art and more particularly to an improved ratio changer for use in a hydraulic brake system.

The principal object of the present invention is to provide a ratio changer for automatically providing a predetermined ratio between the actuating pressures of the front and rear wheel brake assemblies in a motor vehicle.

Another object is to provide a ratio changer which becomes automatically operative to provide a predetermined ratio between pressures in the front and rear wheel brake assemblies after a predetermined fluid pressure is initially exerted therein.

Still another object is to provide a ratio changer having electro-responsive means for stopping normal flow of brake fluid to one set of brake assemblies after a predetermined pressure is developed, a pressure proportional to the pressure in the other set of brake assemblies thereafter being provided in the first-mentioned set of brake assemblies irrespective of the condition of the electro-responsive means.

These and other objects and advantages will become apparent hereinafter.

Briefly, the invention comprises a ratio changer positioned between the master cylinder and one set of brake assemblies in a hydraulic brake system, the ratio changer having a primary passageway permitting initial flow of brake fluid to the set of brake assemblies, electrical means responsive to a predetermined pressure for moving valve means into sealing condition with the primary passageway, and a secondary passageway in communication with a first surface on a reciprocable piston whereby the pressure initially applied to the set of brake assemblies and effective on a second surface of the piston will be overcome by a predetermined differential in pressures acting on the first and second surfaces of the piston, the piston thereafter moving to maintain the differential at a constant value.

The invention also consists in the parts and in the combinations and arrangements of parts hereinafter described and claimed.

In the accompanying drawing which forms a part of this specification and wherein like numerals refer to like parts wherever they occur:

Fig. 1 is a diagrammatic view of a hydraulic brake system including a ratio changer constructed in accordance with the teachings of the present invention, Fig. 2 is a longitudinal sectional view showing the parts of the ratio changer in inoperative position, Fig. 3 is a cross sectional view taken along line 3—3 of Fig. 2 and Fig. 4 is a longitudinal sectional view showing the parts of the ratio changer in operative position.

Referring now to Fig. 1 of the drawing, a ratio changer 10 embodying the teachings of the present invention is shown positioned in a hydraulic brake system 11 of a motor vehicle. The brake system 11 includes a conventional master cylinder 12 actuated by a foot pedal 13 to develop fluid pressure in fluid motors 14 and 15 of the front and rear wheel brake assemblies 16 and 17, respectively. An outlet conduit 18 is provided between the outlet of the master cylinder 12 and a T 19, and branch conduits 20 and 21 connect the outlets of the T 19 to the front and rear fluid motors 14 and 15, respectively. The ratio changer 10 is provided with an inlet 22 and an outlet 23 and is connected in the conduit 20 to the fluid motors 14 so that the ratio changer 10 is interposed between the master cylinder 12 and the front wheel brake assemblies 16 in the hydraulic brake system 11 of heavy trucks. Inasmuch as the ratio changer 10 will provide only a portion of a full braking force in the front wheel fluid motors 14, improved steering conditions will result therefrom and the weight of the truck is sufficient to permit a full braking force in the rear wheel fluid motors 15 without causing skidding. However, the preferred application of a ratio changer 10 for passenger car use is in the conduit 21 between the master cylinder 12 and the rear wheel brake assemblies 17, as will become apparent hereinafter.

Fig. 1 also shows that an electrical circuit 25 is provided for conditioning the ratio changer 10 for operation, the electrical circuit 25 comprising a battery 26 having its negative terminal grounded, as at 27, and its positive terminal connected to one side of a master switch 28, which may be positioned in the operator's cab so that the driver can disable the ratio changer 10 if desired. The other side of the master switch 28 is connected to one terminal 29 of a pressure switch 30, which may be of the conventional stop-light type wherein a diaphragm is flexed under a predetermined fluid pressure to contact the terminals of the switch. The other terminal 31 of the pressure switch 30 is connected to a solenoid 32 in the ratio changer 10, the solenoid 32 being grounded as at 27' so that the electrical circuit 25 is completed and the solenoid 32 is energized when the switches 28 and 30 are closed.

As shown in detail in Figs. 2 and 4, the ratio changer 10 comprises a casing 34 having a bore 35 and a counterbore 36 forming a double-diametral piston chamber, which is defined by bore and counterbore walls 37 and 38, a radial shoulder 39 extending between the adjacent ends of the bore and counterbore walls 37 and 38, a radial wall 40 at the other end of the bore wall 37 and an end plug 41 threadedly received in the other end of the counterbore wall 38. The outlet 23 is formed in the end plug 41, which is tapped to threadedly receive a coupler 42 for securing the conduit 20 thereto.

A two-step cylindrical piston 43 adapted to reciprocate in the bore and counterbore 35 and 36 of the casing 34 is provided with a small diametral portion 44 in sliding contact with the bore wall 37 and a large diametral portion 45 in sliding contact with the counterbore wall 38. An annular projection 46 is formed on the end surface of the small diametral portion 44 to space the end surface of the small portion 44 of the piston from the radial wall 40 of the casing 34. A radial shoulder 47 is formed on the piston 43 between the small and large portions 44 and 45, the radial shoulder 47 being spaced from the radial shoulder 39 of the casing 34 by the abutment of the annular projection 46 of the piston 43 against the radial wall 40 of the casing 34. The piston 43 is provided with an axial bore 48 formed in the end of its small portion 44 and an axial counterbore 49 extending from the bore 48 to the end surface 50 of the large portion 45. A valve member 51 positioned in the counterbore 49 is biased toward an annular valve seat 52 formed between the axial bore and counter bore 48 and 49 by a valve spring 53, which extends to an annular ring 54 in the counterbore 49. The piston 43 is biased to the left with the annular projection 46 in abutting relation with the radial wall 40 by a spring 55 having one end seated in a groove 56 formed about the outlet 23 in the end plug 41 and its other end positioned against the annular ring 54 in the axial counterbore 49 of the piston 43. The piston 43 is also provided with annular sealing cups 57 in sealing contact with the bore and counterbore walls 37 and 38.

A vertical passage 60 is formed in the casing 34 extending from the inlet 22 to a valve chamber 61, which is in axial alignment with the axial bore 48 of the piston 43 and an opening 62 formed in the radial wall 40 of the casing 34. A by-pass valve member 63 is housed in the valve chamber 61 and is provided with an annular gasket 64 for sealing engagement with a cooperating valve seat 65 formed about the opening 62. An opening 66 is provided in the outer wall of the casing 34 so that the solenoid 32 may be secured to the casing in communication with the valve chamber 61.

The solenoid 32 comprises a coil 67 enclosed by a frame 68, which also encloses the opening 66 and the valve chamber 61. A non-magnetic plunger guide 69 extends through the solenoid coil 67 and has its inner end 70 sealably engaged between cooperating faces of the frame 68 and a stationary core 71. The stationary core 71 is provided with a bore 72 and a counterbore 73 centrally formed therethrough, the counterbore 73 forming a portion of the valve chamber 61. An armature or plunger 74 is slidably positioned in the plunger guide 69 and carries a rod-like extension 75 on its right-hand end, the extension passing through the bore and counterbore 72 and 73 of the stationary core 71 into contact with the by-pass valve 63. When the solenoid coil 67 is energized, the armature 74 moves to the right against the stationary core 71, the extension 75 thus moving the by-pass valve 63 onto its seat 65 to cause the ratio changer 10 to become operative, as will be described more fully hereinafter. However, when the solenoid 32 is un-energized and the ratio changer is inoperative, the annular projection 46 of the piston 43 is abutting the radial wall 40 of the casing 34 and the by-pass valve 63 extends into the axial bore 48 of the piston and contacts the end of the valve member 51 so that both of the valve members are prevented from seating, Fig. 2. It is now apparent that when the ratio changer 10 is inoperative, a by-pass passage for brake fluid is provided between the inlet 22 and the outlet 23 and includes the vertical passage 60, the valve chamber 61, the opening 62 in the radial wall 40, the axial bore and counterbore 48 and 49 of the piston 43 and the counterbore 36 is the casing 34.

A radial aperture 76 is formed in the annular projection 46 of the piston 43 so that a portion of the fluid passing through the by-pass passage during a braking application is permitted to flow into the bore 35 between the radial wall 40 and the piston 43. The casing 34 is provided with a diagonal passageway 77, which extends from the radial wall 40 outwardly through a projection 78 of the casing 34, the pressure switch 30 being secured to the projection 78 so that its diaphragm (not shown) is in communication with the bore 35 through the diagonal passageway 77, Figs. 2 and 3.

A horizontal passage 80 is formed in the casing 34 between the vertical passage 60 and the radial shoulder 39 so that the counterbore 38 between the radial shoulders 39 and 47 of the casing 34 and piston 43 will be in direct communication with the master cylinder 12. Therefore, the pressure exerted against the radial shoulder 47 of the piston 43 is always equal to the pressure developed by the master cylinder 12. Furthermore, the surface areas of the radial shoulder 47 and the large end 50 of the piston 43, hereinafter referred to as $A_1$ and $A_2$ respectively, are proportional so that a smaller pressure on the large end 50 will be effective to counter-balance a larger pressure on the radial shoulder 47, as will be described hereinafter.

It is now apparent that as long as the solenoid coil 67 is un-energized, the ratio changer 10 will be inoperative and a braking application will cause fluid from the master cylinder 12 to flow through the by-pass passage of the ratio changer 10 so that equal pressures will be initially built up in the fluid motors 14 and 15 of the front and rear wheel brake assemblies 16 and 17. Simultaneously with the flow of brake fluid through the by-pass passage, a fluid pressure will be developed in the pressure switch 30 by flowing through the aperture 76, the bore 35 between the radial shoulder 40 and the small end of the piston 43, and the diagonal passage 77 to the pressure switch 30. When sufficient pressure is developed to flex the diaphragm in the pressure switch 30, the terminals 29 and 31 will be contacted by the diaphragm and the electrical circuit 25 will be completed when the master switch 28 is closed. The solenoid coil 67 is thus energized and the ratio changer 10 becomes operative to provide a differential between the brake pressures thereafter applied in the front and rear wheel brake assemblies 16 and 17, as will now be described.

Upon the energization of the solenoid coil 67, the armature 74 is moved to the right by magnetic attraction of the stationary core 71 so that the extension 75 on the right-hand end of the armature 74 will move the by-pass valve 63 onto its seat 65 against the restraining action of the valve spring 53. The opening 62 in the radial wall 40 is thus closed and no further brake fluid will flow through the axial bore and counterbore 48 and 49 to the outlet 23 leading to the front wheel brake assemblies 16.

At the instant the solenoid coil 67 is energized and the by-pass valve 63 is seated, the fluid pressure ($P_1$) developed by the master cylinder 12 and exerted on area $A_1$ of the shoulder 47 of the piston 43 is equal to the fluid pressure ($P_2$) acting on area $A_2$ of the large end 50 of the piston 43. However, inasmuch as $A_2$ represents a surface area that is proportionately larger than the surface area represented by $A_1$, the effective force on the large end 50 is greater than the effective force on the radial shoulder 47 of the piston 43. Therefore, assuming that the surface area $A_2$ is twice as large as the surface area $A_1$, the piston 43 is restrained from rightward movement at the moment the solenoid coil 67 is energized by a force on its large end 50 equal to twice the force on its radial shoulder 47 (assuming the pressure exerted by the spring 55 is negligible). Accordingly, an increase in the value of pressure $P_1$ will not be effective to move the piston 43 until a pressure ratio is established between $P_1$ and $P_2$, which is the reciprocal of the $A_1$ to $A_2$ ratio.

As the operator further depresses the foot pedal 13 during a braking application, the pressure $P_1$ developed by the master cylinder 12 and exerted in the fluid motors 15 of the rear wheel brake assemblies 17 and area $A_1$ of the piston 43 will continue to increase. Inasmuch as the by-pass valve 63 prevents the passage of fluid to the front wheel brake assemblies 16 and to the large end 50 of the piston 43, the pressure $P_2$ remains at a constant value after the valve 63 has been seated until the forces effective on the surface areas $A_1$ and $A_2$ of the piston 43 are equal. This is represented best by the formula: $P_1A_1=P_2A_2$. Therefore, the value of pressure $P_1$ will have to increase to twice the value of pressure $P_2$, if $A_2$ is twice the area of $A_1$ It is now apparent that when the forces effective on the surface areas $A_1$ and $A_2$ of the piston 43 have become equalized, an additional increase in the value of pressure $P_1$ will cause the piston 43 to move to the right thereby increasing the value of pressure $P_2$. However, the increase in $P_1$ will always be twice as large as the increase in $P_2$ inasmuch as the area $A_1$ acted on by $P_1$ is half as large as the area $A_2$ acted on by $P_2$, the value of $P_2$ at any given moment being found by the formula:

$$P_2=\frac{A_1}{A_2}P_1$$

Therefore, it is obvious that once the value of $P_1$ has increased to twice the value of $P_2$, this ratio will remain constant throughout the braking application so that twice as much fluid pressure will be exerted on the rear wheel brake assemblies 17 as in the front wheel brake assemblies 16.

As the piston 43 moves to the right under the increasing pressure $P_1$, the valve element 51 contacts its valve seat 52 to prevent the flow of brake fluid from the counterbore 36 of the casing 34 through the axial bore and counterbore of the piston 43 into the bore 35 between the small end of the piston and the radial wall 40 of the casing 34. It is also obvious that as the piston moves to the right with both valve elements 51 and 63 seated, the fluid pressure in the bore 35 will decrease so that the diaphragm in the pressure switch 30 will move out of contact with the terminals 29 and 31 and the solenoid coil 67 is de-energized. However, the by-pass valve 63 will remain seated due to the increased pressure $P_1$ effective in the valve chamber 61 so that the ratio between the fluid pressures applied in the front and rear wheel brake assemblies 16 and 17 will remain constant throughout the braking application.

When the braking application has been completed and the foot pedal 13 is released, the brake fluid will flow back into the master cylinder 12 through the conduit 20 leading thereto. As the pressure $P_1$ is relieved on the surface area $A_1$, the piston 43 will move to the left under the increased effective pressure $P_2$ acting on the area $A_2$ until the annular projection 46 is in abutting relationship with the radial wall 40. The by-pass valve 63 is thus contacted by the valve member 51 so that when the value of pressure $P_1$ falls below the force exerted by the valve spring 53, the by-pass valve 63 will become unseated and the brake fluid in the counterbore 36 will flow through the by-pass passageway into the master cylinder 12.

Although the ratio changer 10 has been shown and described as positioned in the conduit 20 to the fluid motors 14 for the front wheel brake assemblies 16 of a tractor trailer train in order to provide better steering control thereof, it is to be understood that the ratio changer 10 may be positioned in the conduit 21 to the fluid motors 15 for the rear wheel brake assemblies 17 in a passenger car. When so positioned, the effective pressure on the rear wheel brake assemblies 17 will be reduced relative to normal braking pressures so that the rear wheels will not skid due to the reduced traction between the rear wheels and the driving surface resulting from a shift of weight incident to the deceleration of the vehicle.

The invention is intended to cover all changes and modifications of the embodiment of the ratio changer herein chosen for the purposes of disclosure, which do not constitute departures from the spirit and scope of the invention.

What I claim is:

1. A ratio changer for a hydraulic brake system comprising a casing having an inlet and an outlet; a two-step piston slidably positioned in said casing and having a small end with a small chamber adjacent thereto, a large end with a large chamber adjacent thereto and a radial shoulder intermediate said ends, said radial shoulder and said large end of the piston having predetermined surface areas, the former being proportionately smaller than the latter, said radial shoulder being in communication with the inlet and said large end being in communication with the outlet; first passage means between the inlet and said small chamber; first valve means in said first passage means adapted to seal said small chamber from the inlet; second passage means between said small chamber and said large chamber; second valve means in said second passage means adapted to seal said large chamber from said small chamber; electro-responsive means for moving said first valve means into passage sealing position; and pressure responsive means in communication with said small chamber for conditioning said electro-responsive means to move said first valve means.

2. A ratio changer for a hydraulic brake system comprising a casing having an inlet and an outlet; a two-step piston slidably positioned in said casing and having a small end with a small chamber adjacent thereto, a large end with a large chamber adjacent thereto and a radial shoulder intermediate said ends, said radial shoulder and said large end having predetermined surface areas, said radial shoulder being in communication with the inlet and said large end being in communication with the outlet; a first passage between the inlet and said small chamber; a first valve in said first passage adapted to seal the small chamber from said inlet; a solenoid for seating said first valve in first passage sealing position; means responsive to a predetermined fluid pressure in said small chamber for conditioning the solenoid to seat said first valve during a braking application; a second passage formed in said piston between said small chamber and said large chamber; and a second valve positioned in said second passage and movable into second passage sealing position during a braking application whereby said large chamber is sealed from said small chamber.

3. In an automotive hydraulic brake system including a master cylinder, front wheel and rear wheel sets of fluid motors and conduit means between the master cylinder and the fluid motors; the improvement which comprises a ratio changer adapted to be positioned in the conduit means between the master cylinder and one of the sets of fluid motors, said ratio changer comprising a closed casing having an inlet and an outlet, a piston chamber in said casing including a bore and a counterbore with a radial shoulder therebetween, said counterbore being in communication with said outlet, a two-step piston having a small end slidably positioned in said bore and a large end slidably positioned in said counterbore with a radial shoulder formed intermediate said ends, yieldable means for positioning said radial shoulder of said piston adjacent to the radial shoulder of said piston chamber, a first passage between the inlet and said bore, a second passage extending through said piston between said bore and counterbore, a third passage between the inlet and the radial shoulder of said piston, a first valve for sealing said first passage from said bore, a second valve for sealing said second passage, electro-responsive means for moving said first valve into first passage sealing position, yieldable means for moving said second valve into second passage sealing position, and switch means responsive to a predetermined fluid pressure in said bore for energizing said electro-responsive means to move the first valve into passage sealing position during a braking application.

4. In a hydraulic brake system including a master cylinder and front and rear sets of brake assemblies with conduit means therebetween; the improvement which comprises a ratio changer comprising a closed casing having an inlet adapted to be connected to the conduit means to the master cylinder and an outlet adapted to be connected to the conduit means to one of the sets of fluid motors; a piston chamber in said casing having a bore and counterbore with a radial shoulder therebetween; a two-step piston slidably positioned in said piston chamber including a small diametral portion in said bore, a large diametral portion in said counterbore, and a radial shoulder between said ends adjacent to the radial shoulder of said piston chamber, said radial shoulder and the end of said large diametral portion of said piston having predetermined surface areas; annular projecting means for spacing said small diametral portion from the end wall of said bore; a by-pass passage between the inlet and the outlet including a first passageway extending between the inlet and said bore in communication with the opening in said projecting means, and a second passageway between the opening in said projecting means and said outlet; an aperture in said projecting means extending between said opening therein and said bore; a by-pass valve adapted to seal said first passageway; a second valve adapted to seal said second passageway, said valves having adjacent ends in abutting relationship whereby said inlet and outlet are in communication through said by-pass passage; a solenoid adapted to move said by-pass valve into passage sealing position; yieldable means for moving said second valve into passage sealing position; and a pressure switch in communication with said bore for energizing said solenoid in response to a predetermined pressure therein.

5. A ratio changer of the type described, comprising a casing having an inlet and an outlet, a piston slidable in said casing and having a large end area positioned in a large casing chamber in communication with said outlet, and first and second small areas in communication with said inlet through first and second passages, respectively, said first small area and said large end area being predetermined, first valve means in said second passage for sealing said second small area from said inlet, a third passage in communication with said second small area and large casing chamber, second valve means in said third passage for sealing said large casing chamber from said second small area during a braking application, electro-responsive means for moving said first valve means into second passage sealing position, and pressure responsive means in communication with said second small area for conditioning said electro-responsive means to move said first valve means.

References Cited in the file of this patent

UNITED STATES PATENTS

| | | |
|---|---|---|
| 2,144,020 | Hunt | Jan. 17, 1939 |
| 2,219,765 | Chase | Oct. 29, 1940 |
| 2,297,076 | Sacks et al. | Sept. 29, 1942 |
| 2,332,301 | Cox | Oct. 19, 1943 |
| 2,340,462 | Gallup et al. | Feb. 1, 1944 |
| 2,526,968 | Pontius, III | Oct. 24, 1950 |